United States Patent [19]

Bell et al.

[11] 4,186,027
[45] Jan. 29, 1980

[54] PROCESSING OF KAOLINITIC CLAYS AT HIGH SOLIDS

[75] Inventors: David G. Bell; Keith R. Gibson, both of St. Austell, England

[73] Assignee: English Clays Lovering Pochin & Company Limited, St. Austell, United Kingdom

[21] Appl. No.: 910,294

[22] Filed: May 30, 1978

Related U.S. Application Data

[63] Continuation-in-part of Ser. No. 764,380, Jan. 31, 1977, abandoned.

[30] Foreign Application Priority Data

Oct. 7, 1976 [GB] United Kingdom ............... 41817/76

[51] Int. Cl.² .................................................. C09C 1/42
[52] U.S. Cl. .................................. 106/288 B; 106/72; 106/308 Q; 209/5; 209/11; 241/16; 241/20; 423/264; 427/361
[58] Field of Search ...................... 106/288 B, 309, 72, 106/308 B, 306, 308 Q; 423/328, 118, 324, 264

[56] References Cited

U.S. PATENT DOCUMENTS

| 2,251,256 | 7/1941 | Feldenheimer | 106/72 X |
|---|---|---|---|
| 2,339,595 | 1/1944 | Williams et al. | 106/72 X |
| 2,915,412 | 12/1959 | Lyons | 106/72 X |
| 2,920,832 | 1/1960 | Duke | 106/288 B |
| 3,043,707 | 7/1962 | Urfer et al. | 106/72 X |
| 3,371,988 | 3/1968 | Maynard et al. | 106/72 |
| 3,398,008 | 8/1968 | Jacobs et al. | 423/264 |
| 3,446,348 | 5/1969 | Sennett et al. | 106/72 |
| 3,594,203 | 7/1971 | Sawyer et al. | 106/72 X |
| 3,666,513 | 5/1972 | Malden | 423/264 |
| 3,701,417 | 10/1972 | Mercade | 423/264 |
| 3,846,147 | 11/1974 | Tapper | 106/308 B |
| 3,850,655 | 11/1974 | Adams | 106/308 B |
| 3,857,719 | 12/1974 | Baak et al. | 106/308 Q |
| 3,884,964 | 5/1975 | Otrhalek | 106/309 |
| 4,018,673 | 4/1977 | Hughes et al. | 106/72 |
| 4,042,412 | 8/1977 | Williams | 106/288 Q |
| 4,088,732 | 5/1978 | Maynard et al. | 106/72 |

OTHER PUBLICATIONS

Handbook of Chem. & Physics—1970—p. B-98, Calcium Orthophosphates.

Primary Examiner—Helen M. McCarthy
Attorney, Agent, or Firm—Weingram & Klauber

[57] ABSTRACT

A process for treating a clay mineral of the kandite group comprising forming a fluid aqueous suspension of the clay mineral, the suspension having a solids content in the range of from 60% to 75% by weight and a pH in the range of from 7.0 to 11.0 and the suspension containing a dispersing agent to deflocculate the clay mineral; and treating the fluid suspension of clay containing the dispersing agent with a water-soluble reducing bleaching agent under alkaline pH conditions for a time sufficient to give the desired improvement in brightness of the clay. Preferably, the clay mineral suspension is subjected to a particle size separation process at said solids content to reduce the percentage of particles larger than 10μm to not more than 3% by weight. Advantageously, the viscosity of the clay mineral suspension during the particle size separation process is below 2 poise.

7 Claims, No Drawings

PROCESSING OF KAOLINITIC CLAYS AT HIGH SOLIDS

This application is a continuation-in-part of our co-pending application Ser. No. 764,380 filed Jan. 31, 1977, now abandoned, and entitled PROCESSING OF KAOLINITIC CLAYS AT HIGH SOLIDS which application is assigned to the assignee of the present application.

BACKGROUND OF THE INVENTION

This invention relates to clays and, more particularly, is concerned with a process for treating clay minerals of the kandite group, i.e. clay minerals comprising kaolinite, dickite, nacrite or halloysite.

Most raw kaolinitic clays, for example, contain impurities which impair the properties of the clay for paper coating purposes and of these impurities, probably the most important ones are coarse abrasive particles (which include hard minerals such as quartz), and ferric iron-containing compounds which are dark coloured and reduce the overall brightness, or reflectance to visible light, of the clay. It is known that the effect of these discolouring impurities may be reduced by treating the clay with a reducing agent which converts ferric compounds to the less highly coloured ferrous form. The most widely used reducing agents are dithionites, such as sodium and zinc dithionite, alkali borohydrides used in conjunction with alkali bisulphite or pyrosulphite, or sulphoxylates which are compounds formed by the reaction of an aldehyde, especially formaldehyde, with metal salts of dithionous acid.

In a conventional process for reducing the ferric iron-containing impurities in a clay to the ferrous state, the clay is first suspended in water and the pH of the resulting suspension is adjusted to lie in the range of from 2.5 to 5.0. The reducing agent is then added and remains in contact with the clay suspension until substantially all of the ferric compounds which are accessible to the reducing agent (i.e. are not contained within the clay crystal lattice) are reduced to the ferrous state. The ferrous compounds are generally very soluble and pass into the water in which the clay is suspended. The pH of the suspension is then adjusted, if necessary, to about 4.5 or 5.0 and the suspension is then thickened by sedimentation, dewatered by filtration and the cake thus obtained thermally dried. At a pH in the range from 2.5 to 5.0 the clay is flocculated (i.e. the individual clay particles carry both positive and negative electric charges so that they attract one another and clump together to form 'flocs'). In this state a suspension of clay ceases to be fluid when the solids content is above about 40% by weight and the process of bleaching, or reducing the ferric iron-containing impurities in the clay, is therefore usually performed at a solids content of about 15–30% by weight.

Unfortunately very few kaolinitic clays in their raw state have the type of particle size distribution which is required for a good paper coating pigment, i.e. a particle size distribution such that over 80% by weight of the particles have an equivalent spherical diameter smaller than 2 μm and not more than about 3% by weight have an equivalent spherical diameter larger than 10 μm. In order to achieve the desired particle size distribution it is generally necessary to perform one or more particle size separations by, for example, sieving or differential gravitational or centrifugal sedimentation. In order to perform these operations successfully it is essential that the clay should be present in the form of discrete particles rather than flocs so that the particles can be accurately sorted into different size ranges. The clay particles must therefore be treated with a deflocculant, or dispersing agent, (which will give all the particles the same electric charge—usually negative—and cause them to repel each other). Generally, particle size separations have been performed using deflocculated aqueous suspensions having a solids content of about 20% by weight or below, and it has not hitherto been considered practicable to perform a particle size separation, especially by the operations of gravitational or centrifugal separation, on a deflocculated aqueous suspension having a solids content in excess of about 60% by weight.

A paper coating pigment is generally applied to a base paper in the form of a composition comprising a deflocculated aqueous suspension of the pigment and an adhesive. The composition must be sufficiently fluid to enable it to be spread evenly over the surface of a paper web and yet must contain the minimum amount of water because all water which is added with the paper coating pigment must be evaporated thermally when the coated paper is dried, and heat energy is expensive. These two requirements can only be met if the pigment is in the deflocculated rather than the flocculated state; and a clay pigment is normally only fully deflocculated at a pH of about 7 or above. Therefore, in order to produce a good quality paper coating pigment from a raw kaolinitic clay, it is generally necessary to perform one or more particle size separations with the clay in the deflocculated state, flocculate the clay and treat the clay in the flocculated state with a reducing agent, dewater the clay in the flocculated state, and finally prepare a deflocculated suspension for paper coating. Clearly it would be advantageous if all processing could be carried out in the deflocculated state but hitherto it has not been considered possible to bleach kaolinite clays effectively with reducing bleaching agents at a high pH.

We have now made the surprising discovery that a reducing bleaching process can be carried out effectively at a pH greater than 7.0.

SUMMARY OF THE INVENTION

According to the present invention there is provided a process for treating a clay mineral of the kandite group, for example a kaolinitic clay, which comprises forming a fluid suspension of the clay mineral in water, the suspension having a solids content in the range of from 60% to 75% by weight and a pH in the range of from 7.0 to 11.0 and containing a dispersing agent; and treating the fluid suspension of clay containing the dispersing agent with a water-soluble reducing bleaching agent under alkaline pH conditions for a time sufficient to give the desired improvement in brightness of the clay.

The solids content of the suspension is preferably adjusted to lie in the range of from about 68% to about 72% by weight because this gives a suspension which is fluid and easily pumped and yet does not entail the transportation of a large quantity of water.

The fluid suspension of clay is preferably treated with the water-soluble reducing bleaching agent at a pH in the range of from 7.5 to 10.5, most preferably in the range of from 8.5 to 9.5.

The dispersing agent used may be, for example, a water-soluble salt of a condensed phosphate, such as a pyrophosphate, a hexameta-phosphate or a tripolyphosphate, or a water-soluble salt of a polysilicic acid, for example sodium silicate, or a water-soluble organic polymeric dispersing agent, for example a polyacrylate or a polymethacrylate having a number average molecular weight in the range from about 500 to about 10,000 or a copolymer of the type described in British Pat. Specification No. 1,414,964. The amount of dispersing agent used will generally lie in the range of from 0.05 to 0.6% by weight based on the weight of dry clay.

A particularly advantageous dispersing agent for use in the present invention has been found to be a mixture of a water-soluble condensed phosphate with an organic polymeric dispersing agent, for example one of the polyacrylate, polymethacrylate or copolymeric type described above. The relative proportions by weight of water-soluble condensed phosphate and organic polymeric dispersing agent are preferably such that there are from 2.5 to 7 parts by weight of the condensed phosphate to 1 part by weight of the organic polymeric dispersing agent. An especially suitable dispersing agent has been found to be the mixture of about 5 parts by weight of tetrasodium pyrophosphate and 1 part by weight of sodium polyacrylate having a number average molecular weight of about 1650.

In the treatment with the reducing bleaching agent, the bleaching agent is most preferably sodium or zinc dithionite which is advantageously added in an amount in the range of from 1 to 15 lb. of bleaching agent per ton of dry clay (0.4–7.0 kg/ton). The suspension is preferably first agitated sufficiently rapidly to cause a vortex while the bleaching agent is added, but as soon as all the bleaching agent has been added the speed of agitation is reduced until the vortex collapses and is maintained at this level for about 30 minutes. This is to minimise the introduction of air into the suspension thus decreasing the effectiveness of the reducing bleaching agent through reaction with oxygen in the air.

Since in the preferred embodiments of the process of the invention the clay suspension need not be dewatered, any soluble impurities which are formed during the bleaching reaction remain in the presence of the clay. These soluble impurities include ferrous salts which, on exposure to air, might be re-oxidized to the more highly coloured ferric form. It is therefore desirable to precipitate the ferrous compounds in a colourless or lightly coloured form. For this reason it is preferred to add to the suspension a source of phosphate ions, preferably in an amount in the range of from 1 to 20 lb. of the phosphate ion source per ton of dry clay (0.4–9.0 kg/ton). Calcium orthophosphate is a convenient phosphate ion source but many other soluble or insoluble phosphates may be used, for example the ammonium and alkali metal condensed phosphates and secondary and tertiary orthophosphates. When the dispersing agent used comprises a condensed phosphate it is not necessary to add to the suspension an additional source of phosphate ions. The ferrous compounds are precipitated as ferrous phosphate which is light coloured and on contact with oxygen in the air any ferric phosphate which is formed is also very light in colour. It is advantageous to agitate the clay suspension with the reducing bleaching agent for a time sufficient to complete the bleaching reaction, usually about 30 minutes, before adding the phosphate ion source. The phosphate ion source is conveniently agitated with the suspension of bleached clay for about 15 minutes.

The clay suspension containing from 60% to 75% by weight of solids and having a pH in the range of from 7 to 11 is advantageously subjected to a particle size separation technique to remove coarse particles. The clay suspension is preferably subjected to the particle size separation technique before being treated with the bleaching agent, but satisfactory results may also be obtained when this order is reversed or when two particle size separations are performed, one before and one after the treatment with the bleaching agent.

In the particle size separation technique the coarsest particles may be removed by passing the clay suspension through a sieve which may be vibrated and which conveniently has an aperture size in the range of from 40 to 150 $\mu$m. Alternatively or subsequently to the sieving operation the clay suspension may be subjected to gravitational or centrifugal sedimentation, the coarser particles collecting in the sediment and the finer particles remaining in suspension. Conveniently substantially all particles having an equivalent spherical diameter larger than 10 $\mu$m are removed.

In some embodiments of the invention it may be advantageous to heat the clay suspension to a temperature such that the viscosity thereof is less than 2 poise, and subjecting the suspension, whilst still heated, to the particle size separation technique. The temperature of the clay suspension may be raised by, for example, passing the suspension through a heat exchanger, by steam coils or electric heaters immersed in the suspension, by gas or oil burners below the container for the suspension or by blowing steam directly into the suspension. The temperature to which the clay suspension is raised depends on the properties of the raw clay. For example, if the raw clay naturally forms an aqueous suspension of relatively low viscosity at a high solids content it will not be necessary to raise the temperature by more than a few degrees. Generally the temperature will not be raised above 65° C. because evaporation becomes excessive above this point and a clay suspension becomes unpleasant to handle at such temperatures. The viscosity of a suspension of a kaolin clay which is sufficiently fine for paper coating purposes is often about 3 poise or more (as measured with a Brookfield viscometer) at ambient temperature and a solids content of 70% by weight. We believe that a commercially viable particle size separation cannot be performed at the present time in a kaolin clay suspension having a viscosity of this order. Therefore the temperature of the suspension is preferably raised to a level such that the viscosity of the suspension is brought to a value in the range of from about 1.2 to about 1.8 (as measured with a Brookfield viscometer using spindle No. 3 and a speed of 100 r.p.m.). At temperatures in the range of from 50° to 65° C. appreciable evaporation of water from the clay suspension will occur, thus raising the solids content. When operating at these higher temperatures, the initial suspension is conveniently formed at a slightly lower solids content than that which is finally required in the knowledge that the solids content will rise to the required level by evaporation of water. Also, as a general rule, the lower the viscosity of the clay suspension, the faster may the deflocculated suspension be passed through the centrifuge and still achieve the required reduction in the abrasive particle content.

The centrifuge, when used, is preferably a solid bowl centrifuge with a helical conveyor or scroll as described in "Chemical Engineers' Handbook", 5th ed., by Robert H. Perry and Cecil H. Chilton, McGraw-Hill Book Co., New York, (1973), pages 19–91, 19–92, and 21–49. Alternatively, a batch-type solid bowl centrifuge as described in pages 19–93 of "Chemical Engineers' Handbook" or a nozzle discharge, disc centrifuge as described in pages 19–91 may be used.

After being subjected to a particle size separation technique and treated with a bleaching agent in accordance with the process of the present invention, the clay is conveniently transferred to a suitable container for transit and sale.

The invention is further illustrated by the following Examples.

EXAMPLE 1

A raw kaolin clay from Warren County, Ga., U.S.A. was mixed with water containing dispersing agents to form a suspension containing 69% by weight of dry kaolin. The dispersing agents used were tetrasodium pyrophosphate and a sodium polyacrylate having a number average molecular weight of 1650 and they were used in the proportions 5 parts by weight of tetrasodium pyrophosphate to 1 part by weight of sodium polyacrylate. The total amount of dispersing agents used was 0.4% by weight of the combined dispersing agents based on the weight of the dry kaolin. The pH was corrected to 9.0 with sodium hydroxide and the raw clay was dispersed in the water in a mixer which comprised a cylindrical vessel of diameter 450 mm and depth 450 mm and an impeller consisting of a single round bar of length 75 mm and diameter 9.5 mm which was rotated at a speed of 2850 r.p.m. by means of a 1 H.P. electric motor.

The dispersed aqueous suspension of kaolin was passed through a No. 100 mesh B.S. sieve (nominal aperture 150 μm) to remove the coarsest particles and the sieved suspension was treated in a scroll-type centrifuge in which the coarser particles were sedimented leaving a suspension which had a particle size distribution such that 0.01% by weight consisted of particles having a diameter larger than 50 μm, 3% by weight consisted of particles having an equivalent spherical diameter larger than 10 μm, and 83% by weight consisted of particles having an equivalent spherical diameter smaller than 2 μm. This suspension was divided into a number of portions. Two of these portions, A and B, were then treated as follows:

Portion A was diluted to a solids content of about 15% by weight and then further divided into five portions which were treated in a conventional manner, after the pH of the suspension had been reduced to 2.8 with sulphuric acid, with 0, 4, 6, 8 and 10 lb of sodium dithionite respectively per ton of dry kaolin. After 30 minutes the pH of each portion was raised to 4.2 with sodium hydroxide. Each portion was then filtered and the cake dried at 80° C. and milled in a machine of the type used for grinding coffee beans for 30 seconds in order to prepare the sample for brightness measurement. The reflectance of the milled, bleached kaolin to light of wavelength 458 nm and 574 nm was measured by means of an Elrepho brightness meter.

Portion B, having a solids content of 69% by weight and a pH of 8.5 was divided into five portions which were treated with a 12.5% w/w solution of sodium dithionite in water, the amount of said solution added to each portion being such that the five portions were treated respectively with 0, 4, 6, 8 and 10 lb of sodium dithionite per ton of dry kaolin. The portions of suspension were stirred by hand while the sodium dithionite solution was added and were then left to stand for approximately 15 hours before being dried at 80° C. and milled and tested for brightness as described above.

The results obtained are set forth in Table 1 below.

TABLE 1

| Dose of Sodium dithionite (lb/ton) | Portion A Reflectance to light of wavelength | | Portion B Reflectance to light of wavelength | |
|---|---|---|---|---|
| | 458 nm | 574 nm | 458 nm | 574 nm |
| 0 | 83.1 | 90.3 | 82.5 | 90.2 |
| 4 | 85.0 | 91.7 | 85.0 | 91.1 |
| 6 | 85.7 | 91.8 | 85.2 | 90.9 |
| 8 | 86.2 | 92.0 | 85.7 | 91.1 |
| 10 | 86.4 | 92.0 | 84.0 | 90.6 |

These results show that, within the limits of experimental accuracy, the improvement in brightness obtained by the method of the invention is comparable to that obtained by the conventional method and the method of the invention avoids the need to add a large quantity of water which must subsequently be removed by filtration and thermal drying.

EXAMPLE 2

A further portion of the suspension of kaolin prepared as described in Example 1 above was bleached with 8 lb of sodium dithionite per ton of dry kaolin by the method described in Example 1 for portion B except that the 12.5 w/w solution of sodium dithionite was added while the kaolin was stirred sufficiently vigorously to form a vortex, and then when all the sodium dithionite had been added, the speed of the stirrer was reduced until the vortex just collapsed and stirring was continued at this speed for 30 minutes. The bleached kaolin suspension was then dried at 80° C., milled and tested for brightness as described above. The reflectance of the dry bleached kaolin to light of wavelength 458 nm was 86.6 and to light of wavelength 547 nm was 92.1.

EXAMPLE 3

A different raw kaolin from Warren County, Ga. Was formed into an aqueous suspension in the manner described in Example 1 and, after being passed through a No. 100 mesh B.S. sieve, was heated to a temperature of 31° C. by means of gas burners underneath the container for the suspension. The heated suspension was found to have a viscosity of 1.35 poise as measured by a Brookfield Viscometer using Spindle No. 3 and a speed of 100 r.p.m. The heated suspension was then divided into four portions which were passed through a rotating laboratory scroll-type centrifuge at rates of 0.5 gpm., 1 gpm., 2 gpm., and 3 gpm. respectively, and the coarser particles were sedimented leaving the finer particles in suspension. (The abbreviation "gpm" means Imperial gallons per minute). The percentages by weight of particles in the fine fraction having an equivalent spherical diameter larger than 10 μm and smaller than 2 μm respectively, were determined in each case and the finer fractions were each then dried and their Valley abrasion measured. The results are set forth in Table II below.

TABLE II

| Feed Rate (gpm) | % by weight of solids | % by weight of particles larger than 10 μm | Smaller than 2 μm | Valley Abrasion |
| --- | --- | --- | --- | --- |
| Untreated | 70.9 | 11 | 81 | 52 |
| 0.5 | 69.2 | 3 | 91 | 15 |
| 1 | 69.4 | 3 | 90 | 20 |
| 2 | 69.7 | 5 | 88 | 30 |
| 3 | 69.8 | 5 | 87 | 30 |

These results show that a product with an acceptable abrasion value (Valley abrasion not greater than 30) was obtained even at a throughput rate of 3 gpm in the laboratory scroll-type centrifuge.

The four products which had been treated in the centrifuge were combined and thoroughly mixed together and then divided again into two portions A and B.

Portion A was diluted to a solids content of about 15% by weight and the pH was reduced to 2.8 with sulphuric acid. The suspension was then further divided into five portions which were treated in a conventional manner with 0, 4, 6, 8 and 10 lb. of sodium dithionite respectively per ton of dry kaolin. In each case the suspension was stirred for 10 minutes and the pH was then raised to 4.5 with sodium hydroxide. The suspension of bleached kaolin was then filtered, the cake dried at 80° C., milled and tested for brightness.

Portion B, having a solids content of 69.6% and a pH of 8.5 was further divided into five portions which were treated in accordance with the invention, with a 12.5% w/w solution of sodium dithionite in water, the amount of sodium dithionite added to each portion being respectively 0, 4, 6, 8 and 10 lb per ton of dry kaolin and the method of mixing being as described in Example 2. In each case the bleached kaolin suspension was dried at 80° C., milled and tested for brightness. The results are set forth in Table III below.

TABLE III

| Dose of sodium dithionite (lb/ton) | Portion A Reflectance to light of wavelength | | Portion B Reflectance to light of wavelength | |
| --- | --- | --- | --- | --- |
| | 458 nm | 574 nm | 458 nm | 574 nm |
| 0 | 81.8 | 90.2 | 80.5 | 90.0 |
| 4 | 82.8 | 90.6 | 82.9 | 90.5 |
| 6 | 83.7 | 91.1 | 83.2 | 90.6 |
| 8 | 83.6 | 91.0 | 83.1 | 90.4 |
| 10 | 83.7 | 91.1 | 83.4 | 90.5 |

EXAMPLE 4

A raw kaolin from Wilkinson County, Ga. was formed into an aqueous suspension in the manner described in Example 1 and, after being passed through a No. 100 mesh B.S. sieve was heated to a temperature of 36° C. The heated suspension was found to have a viscosity of 1.44 poise as measured by a Brookfield Viscometer using Spindle No. 3 and a speed of 100 rpm. The heated suspension was then divided into four portions which were passed through a rotating laboratory scroll-type centrifuge at rates of 0.5 gpm, 1 gpm, 2 gpm, and 3 gpm, respectively, and the coarser particles were sedimented leaving the finer particles in suspension. The percentages by weight of particles in the fine fraction having an equivalent spherical diameter larger than 10 μm and smaller than 2 μm respectively, were determined in each case and the finer fractions were each then dried and their Valley abrasion measured. The results are set forth in Table IV below.

TABLE IV

| Feed Rate (gpm) | % by weight of solids | % by weight of particles larger than 10 μm | smaller than 2 μm | Valley abrasion |
| --- | --- | --- | --- | --- |
| Untreated | 70.6 | 6 | 84 | 94 |
| 0.5 | 69.9 | 2 | 89 | 16 |
| 1 | 70.0 | 2 | 89 | 12 |
| 2 | 70.2 | 3 | 89 | 14 |
| 3 | 70.2 | 4 | 87 | 14 |

The four products which had been treated in the centrifuge were combined and thoroughly mixed together and then divided into two portions A and B.

Portion A was diluted to a solids content of about 15% by weight and the pH was reduced to 2.8 with sulphuric acid. The suspension was then further divided into five portions which were treated in a conventional manner with 0, 4, 6, 8 and 10 lb of sodium dithionite respectively per ton of dry kaolin. In each case the suspension was stirred for 30 minutes and the pH was then raised to 4.2 with sodium hydroxide. The suspension of bleached kaolin was then filtered, the cake dried at 80° C., milled and tested for brightness.

Portion B having a solids content of 68.7% and a pH of 9.0 was further divided into five portions which were treated, in accordance with the invention, with a 12.5 w/w solution of sodium dithionite in water, the amount of sodium dithionite added to each portion being respectively 0, 4, 6, 8 and 10 lb per ton of dry kaolin and the method of mixing being as described in Example 2. In each case the bleached kaolin suspension was dried at 80° C. milled and tested for brightness. The results are set forth in Table V below:

TABLE V

| Dose of sodium dithionite (lb/ton) | Portion A Reflectance to light of wavelength | | Portion B Reflectance to light of wavelength | |
| --- | --- | --- | --- | --- |
| | 458 nm | 574 nm | 458 nm | 574 nm |
| 0 | 82.4 | 90.8 | 80.7 | 89.7 |
| 4 | 85.3 | 92.1 | 84.5 | 91.2 |
| 6 | 85.3 | 91.9 | 84.5 | 91.0 |
| 8 | 85.4 | 92.2 | 85.3 | 91.1 |
| 10 | 85.0 | 91.8 | 85.4 | 91.2 |

EXAMPLE 5

A different raw kaolin clay from Warren County, Ga., U.S.A. was divided into portions which were mixed with water containing different systems of dispersing agent to form suspensions containing 70% by weight of dry kaolin. The viscosity of each suspension was measured at 20° C. with a Brookfield Viscometer using spindle No. 3 at 100 rpm. The dispersing agents used were tetrasodium pyrophosphate (TSPP) and sodium polyacrylate of number average molecular weight of 1650, either separately or mixed together in various proportions. The viscosity results, in centipoise, obtained for the various systems of dispersing agent are set forth in Table VI below.

TABLE VI

| % by weight of TSPP | 0.2 | | | | 0.25 | | | | 0.3 | | | | 0 |
| --- | --- | --- | --- | --- | --- | --- | --- | --- | --- | --- | --- | --- | --- |
| % by wt of Polyacrylate | 0 | 0.025 | 0.05 | 0.075 | 0 | 0.025 | 0.05 | 0.075 | 0 | 0.025 | 0.05 | 0.075 | 0.3 |

TABLE VI-continued

| | | | | | | | | | | | | |
|---|---|---|---|---|---|---|---|---|---|---|---|---|
| initial viscosity | 470 | 430 | 444 | 465 | 310 | 275 | 280 | 298 | 250 | 265 | 295 | 308 | 425 |
| after storage for 1 day | 980 | 445 | 450 | 468 | 880 | 318 | 285 | 310 | 790 | 345 | 305 | 312 | 426 |
| after storage for 4 days | 1372 | 460 | 453 | 471 | 940 | 363 | 289 | 320 | 810 | 410 | 310 | 318 | 426 |
| after storage for 7 days | 1640 | 478 | 460 | 472 | 1010 | 392 | 290 | 325 | 865 | 450 | 330 | 326 | 428 |
| after storage for 10 days | — | 485 | 462 | 475 | 1240 | 420 | 292 | 330 | 970 | 480 | 335 | 330 | 430 |

The pH of the suspension deflocculated with sodium polyacrylate alone was 6.5 but the pH of all the other suspensions was maintained at 7.3. It will be seen that the best results were obtained by deflocculating the suspension of kaolin clay with a mixture of 0.25% by weight of TSPP and 0.05% by weight of polyacrylate, both based on the weight of dry clay, but mixtures consisting of 0.25% by weight of TSPP and 0.075% by weight of polyacrylate, and 0.3% by weight of TSPP and 0.05% and 0.75% of polyacrylate also gave acceptable results. Each of these four suspensions was sufficiently fluid, after the temperature had been raised to within the range 30°–65° C., to enable the suspension to be refined in a rotating scroll-type centrifuge to give products containing not more than 2% by weight of particles having an equivalent spherical diameter larger than 10 μm.

The fine product in each case was then treated with sodium dithionite at the same pH of 7.3 in order to improve the brightness of the clay. In each case a stable suspension of kaolin was produced which was sufficiently fluid to pump from one container to another and yet not so fluid that substantial quantities of kaolin sedimented in pipes and vessels, and was of suitable quality for use in preparing a paper coating composition.

EXAMPLE 6

A different raw kaolin from Warren County, Ga., U.S.A. was divided into portions which were mixed with water containing a total of 0.4% by weight, based on the weight of dry solids, of a mixture of dispersing agents consisting of 5 parts by weight of tetrasodium pyrophosphate and 1 part by weight of sodium polyacrylate of number average molecular weight of 1650. The solids content of each suspension was 70% by weight but the pH was adjusted with sodium hydroxide or sulphuric acid as necessary to give a range of pH values from 6.5 to 11.5. The viscosity of each suspension was measured at 22° C. with a Brookfield Viscometer using spindle no. 3 at 100 rpm and the results are set forth in Table VII below.

TABLE VII

| pH of suspension | Viscosity (centrifuge) |
|---|---|
| 6.5 | 614 |
| 7.0 | 365 |
| 7.5 | 177 |
| 8.0 | 152 |
| 8.5 | 136 |
| 9.0 | 132 |
| 9.5 | 132 |
| 10.0 | 141 |
| 10.5 | 158 |
| 11.0 | 280 |
| 11.5 | 597 |

It was found that the suspensions which had been prepared at a pH of 6.5 or 11.5 were too viscous to be refined successfully in a scroll-type centrifuge to give a product which was substantially free of particles having an equivalent spherical diameter larger than 10 μm, even when the temperature of the suspension was raised to within the range 30°–65° C. With this particular kaolin the best results were obtained with the suspensions which had been prepared at a pH within the range 7.5–10.5, and especially with those suspensions which had been prepared at pH values of 9.0 and 9.5.

The fine products obtained from the seven suspensions which had been prepared at pH values in the range 7.5–10.5 were each treated with sodium dithionite, without adjusting the pH, in order to improve the brightness of the kaolin and in each case a stable suspension of kaolin was produced which was sufficiently fluid to pump from one container to another and yet not so fluid that substantial quantities of kaolin sedimented in pipes and vessels, and was of suitable quality for use in preparing a paper coating composition.

We claim:

1. A process for treating a raw kaolinitic clay mineral which comprises forming a fluid aqueous suspension of the kaolinitic clay mineral, said suspension having a solids content in the range of from about 60% to about 75% by weight and a pH in the range of from 7.5 to 10.5 and said suspension containing from 0.05 to 0.6% by weight of the dry clay of a dispersing agent system comprising from 2.5 to 7 parts by weight of a water-soluble condensed phosphate to 1 part by weight of a water-soluble organic polymeric dispersing agent; subjecting said suspension to a particle size separation technique at a temperature such that the viscosity thereof is less than 2 poise to reduce the percentage by weight of the particles larger than 10 μm in said suspension to not more than 3% by weight; and treating said 60% to 75% solids suspension with a water-soluble reducing bleaching agent at an alkaline pH in the range of pH 7.5 to 10.5 for a time sufficient to increase the brightness of the clay mineral, said process being carried out without the necessity for dewatering said suspension.

2. A process according to claim 1, wherein the fluid suspension contains from about 68% to about 72% by weight of solids.

3. A process according to claim 1, wherein the fluid suspension of clay is treated with the water-soluble reducing bleaching agent at a pH in the range 8.5 to 9.5.

4. A process according to claim 1, wherein the water-soluble reducing bleaching agent is sodium or zinc dithionite which is employed in an amount in the range of from 1 to 15 lb. of bleaching agent per ton of dry clay.

5. A process according to claim 1, wherein the clay suspension is agitated sufficiently rapidly to cause a vortex while the bleaching agent is added thereto but when the bleaching agent has been added the degree of agitation is reduced until the vortex collapses.

6. A process according to claim 1, wherein the clay suspension is maintained at a temperature in the range of from 30° C. to 65° C. whilst it is subjected to said particle size separation technique.

7. A process according to claim 1, wherein the clay suspension is maintained at a temperature such that the viscosity of the clay suspension is less than 2 poise by passing the suspension through a heat exchanger, by immersing steam coils or electric heaters in the suspension, by heating the container for the clay suspension or by blowing steam directly into the clay suspension.

* * * * *